(No Model.)
F. RENDERS.
LUBRICATOR.
No. 313,951. Patented Mar. 17, 1885.
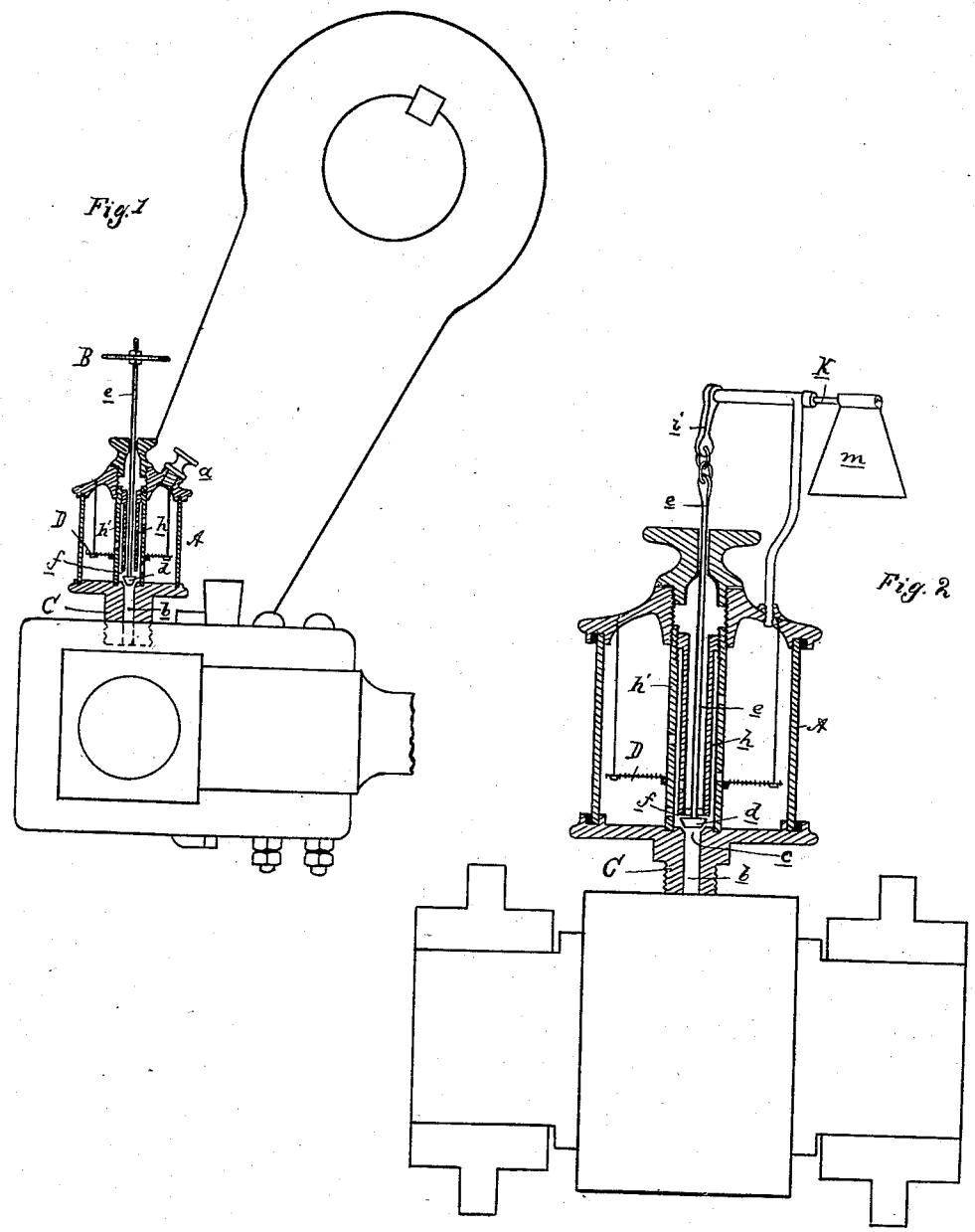
Attest
John Schuman.
E. F. Scully.
Inventor:
Frank Renders
by his Atty
Thos. S. Sprague

UNITED STATES PATENT OFFICE.

FRANK RENDERS, OF DETROIT, MICHIGAN.

LUBRICATOR.

SPECIFICATION forming part of Letters Patent No. 313,951, dated March 17, 1885.

Application filed January 14, 1885. (No model.)

*To all whom it may concern:*

Be it known that I, FRANK RENDERS, of Detroit, in the county of Wayne and State of Michigan, have invented new and useful Improvements in Lubricators; and I do hereby declare that the following is a full, clear, and exact description thereof, reference being had to the accompanying drawings, which form a part of this specification.

This invention relates to certain new and useful improvements in lubricators or oilers of the class that are employed for lubricating crank-pins, slides, or other parts of mechanism which are in motion.

The invention consists in so constructing the oiler that the valve which controls the outflow of oil from the cup will be actuated by aerial pressure obtained by the motion of the part to which the oiler is attached.

It further consists in the peculiar construction, combination, and operation of the various parts, as more fully hereinafter described.

Figure 1 is a central vertical section of my improvement as when attached to a crank for the purpose of oiling the pin. Fig. 2 is a like view showing the necessary mechanical change necessary to adapt the device for oiling a cross-head and its slides.

In the accompanying drawings, which form a part of this specification, A represents a fountain to hold the lubricant, and the form of this and the material of which it is constructed are immaterial, so long as it is provided with an inlet, *a*, for filling, and an outlet, *b*, for discharging, the oil, which latter outlet is preferably centrally located, as shown. This outlet has a valve-seat, *c*, and a valve, *d*, of like shape to the shape of the seat, is provided and attached to a stem, *e*, which passes through the top of the cup, and has secured to its upper end a metallic disk, B. The lower end of the cup is provided with a threaded plug, C, or other analogous means for securing the cup to the part to be lubricated.

The above description, wherein the disk is employed, adapts the device to be employed in oiling a crank-pin, wherein the downward part of the stroke will cause a pressure of air against the under side of the disk sufficient to raise the valve from its seat and allow the oil to escape to the part to be lubricated, while the upward part of the stroke will change the air-pressure from the under to the upper side of the disk, and thereby close the valve, and this alternate opening and closing of the valve will take place at each revolution of the crank, whether running faster or slower.

To prevent too much play of the valve, and to limit it, a stop, *f*, is provided, which may be put in as may be dictated by ordinary mechanical skill. In the drawings, this stop is made by the insertion of a tube or pipe, *h*, through which the valve-stem passes, the lower end of this pipe forming the stop. When the pipe is used for this purpose, it would be well to perforate it in one or more places, as shown, to facilitate the passage of the oil.

*h'* is a pipe surrounding the pipe *h*, and fitting in a socket in the plug C, and threaded internally and externally at its upper end, as shown. The top of the pipe engages with a thread on the top of the fountain, thus holding the parts of the oil-cup together, while the pipe *h* engages with the internal thread of said outer pipe, as clearly shown in the drawings.

In a crank-pin oiler it frequently happens, especially when the oil is partially exhausted from the fountain, that the motion of the crank to which it is attached will throw the oil away from the outlet, so that none will escape when the valve is open, and this danger is increased by a rapid revolution of the crank. To entirely prevent such accident, there may be inserted a perforated diaphragm, D, made of finely-perforated sheet metal or of wire-cloth, which will tend to confine the oil when it gets low in the fountain.

In Fig. 2 the same oiler is shown with the disk removed and fitted to be actuated by the aerial pressure created by the reciprocating motion of a cross-head when the oiler is attached to such cross-head for the purpose of lubricating it and its slides. In this case the upper end of the valve-stem is connected suitably to a crank, *i*, which is secured to the end of a rocking arm, *k*, which is supported in proper bearings, which will allow such arm to rock freely under the actuation of the wing or fan *m*, which is secured to the free end of the arm, which is so supported in its bearings that when the cross-head is moving in one direction the air-pressure upon the fan will cause the rocking of the arm, and thereby open the valve through the intermediate connections, and when moving in the opposite direction the air-pressure upon the fan will cause the valve to close.

I am aware of the Patent No. 221,274, and make no claim to the construction shown therein as forming part of my invention.

What I claim as my invention is—

1. A lubricator consisting of a fountain, A, having inlet and outlet passages, a valve actuated by the aerial pressure created by the movement of the parts to which said lubricator is attached, a tube surrounding the stem of said valve, the bottom of said tube forming a stop to limit the play of said valve, substantially as and for the purposes specified.

2. In an oiler, the combination, with a fountain having inlet and outlet passages, and a valve provided with a stem, $e$, of the swinging crank $i$, connected with the upper end of said stem, and provided with the wing $m$, constructed to be operated by the aerial pressure created by the reciprocation of the parts to which the oiler is attached, substantially as and for the purpose specified.

3. In an oiler, the combination, with a fountain having inlet and outlet passages, and a valve provided with a stem, $e$, of the crank $i$, connected with the upper end of said stem, the rocking arm $k$, supported in suitable bearings and carrying said crank, and the wing $m$, secured to the free end of said arm, substantially as and for the purposes specified.

4. An oiler consisting of a fountain to contain the oil, with inlet and outlet passages, a valve controlling the outlet-passage, a stop to limit the throw of such valve, a disk secured to the free end of the valve-stem, and a perforated diaphragm within such fountain, the parts being constructed, arranged, and operating substantially as and for the purposes described.

FRANK RENDERS.

Witnesses:
E. J. SCULLY,
E. W. ANDREWS.